United States Patent [19]
Fröhlich et al.

[11] Patent Number: 5,231,737
[45] Date of Patent: Aug. 3, 1993

[54] SLIDE FASTENER

[75] Inventors: Alfons Fröhlich; Heinz Smyczek, both of Essen; Horst Bettin, Bochum, all of Fed. Rep. of Germany

[73] Assignee: Opti Patent-, Forschungs- und Fabrikations AG, Riedern-Allmeind, Switzerland

[21] Appl. No.: 740,392

[22] Filed: Aug. 5, 1991

[30] Foreign Application Priority Data

Aug. 4, 1990 [DE] Fed. Rep. of Germany ....... 4024839

[51] Int. Cl.$^5$ .............................................. A44B 19/38
[52] U.S. Cl. ...................................................... 24/434
[58] Field of Search ................. 24/434, 413, 398, 433, 24/435

[56] References Cited

U.S. PATENT DOCUMENTS

| | | | |
|---|---|---|---|
| 3,030,684 | 9/1962 | Johns et al. ............................ | 24/434 |
| 4,001,922 | 1/1977 | Ward, Jr. .............................. | 24/434 |
| 4,078,279 | 3/1978 | Heimberger .......................... | 24/434 |
| 4,312,103 | 1/1982 | Akashi ............................... | 24/434 X |
| 4,422,221 | 12/1983 | Akashi ............................... | 24/434 |
| 4,488,337 | 12/1984 | Yoshida et al. ....................... | 24/413 |
| 4,490,890 | 1/1985 | Yoshida et al. ....................... | 24/413 |
| 4,765,038 | 8/1988 | Kasai ................................. | 24/398 |
| 4,870,724 | 10/1989 | Fujisaki et al. ..................... | 24/413 X |
| 4,922,584 | 5/1990 | Funakawa et al. .................... | 24/413 X |

FOREIGN PATENT DOCUMENTS 2035445 6/1980 United Kingdom .................. 24/413

*Primary Examiner*—James R. Brittain
*Attorney, Agent, or Firm*—Herbert Dubno; Andrew Wilford

[57] ABSTRACT

A slide fastener has a pair of longitudinally extending and parallel textile tapes having thickened longitudinal edges that are transversely juxtaposed and formed with throughgoing holes at transversely aligned locations and that are provided with respective longitudinally extending rows of transversely projecting and interleavable coupling teeth. A slider having slots fittable over the edges is displaceable along the edges over the teeth in one longitudinal direction for interleaving the teeth and coupling the tapes together transversely and in the opposite direction for disengaging the teeth from each other and decoupling the tapes from each other. Thickened synthetic-resin reinforcement tabs are integrally molded onto the tapes at the locations of the throughgoing holes and extend thereat transversely up to the edges. Synthetic-resin coupling lugs molded on the edges at the locations each have a pair of ribs flanking the respective tape at the respective holes and unitarily joined with each other through the tape at the holes. The lugs and their ribs are engageable through the respective slots of the slider.

4 Claims, 6 Drawing Sheets

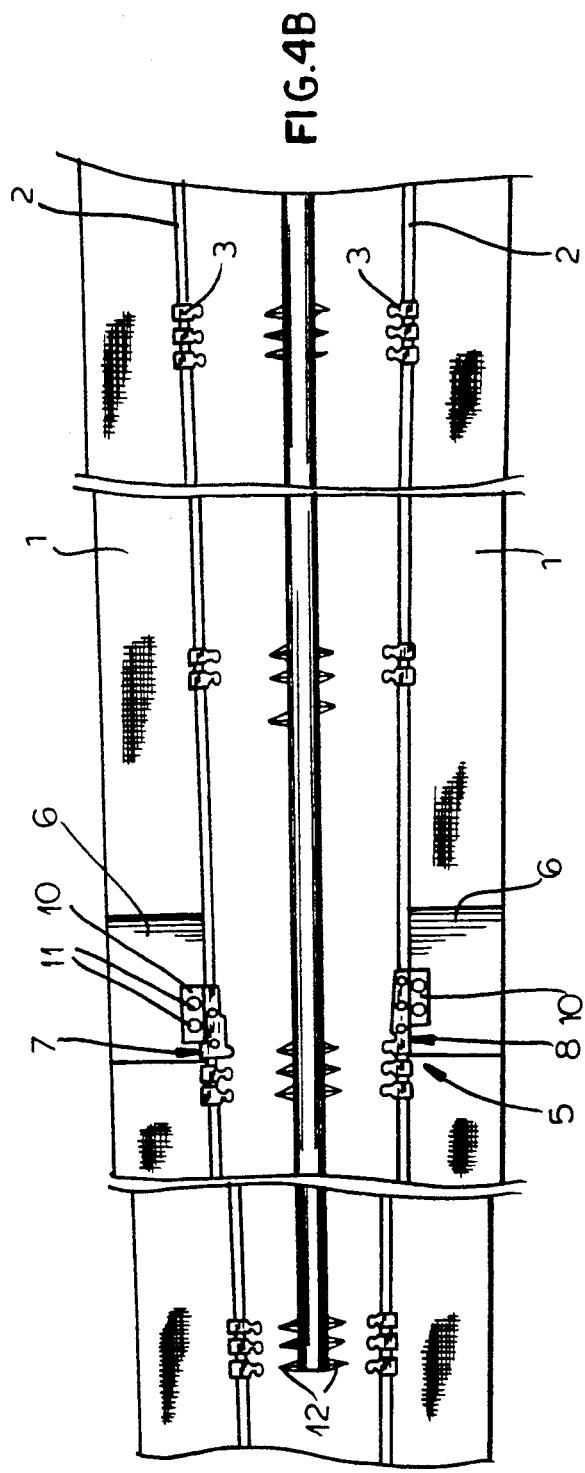
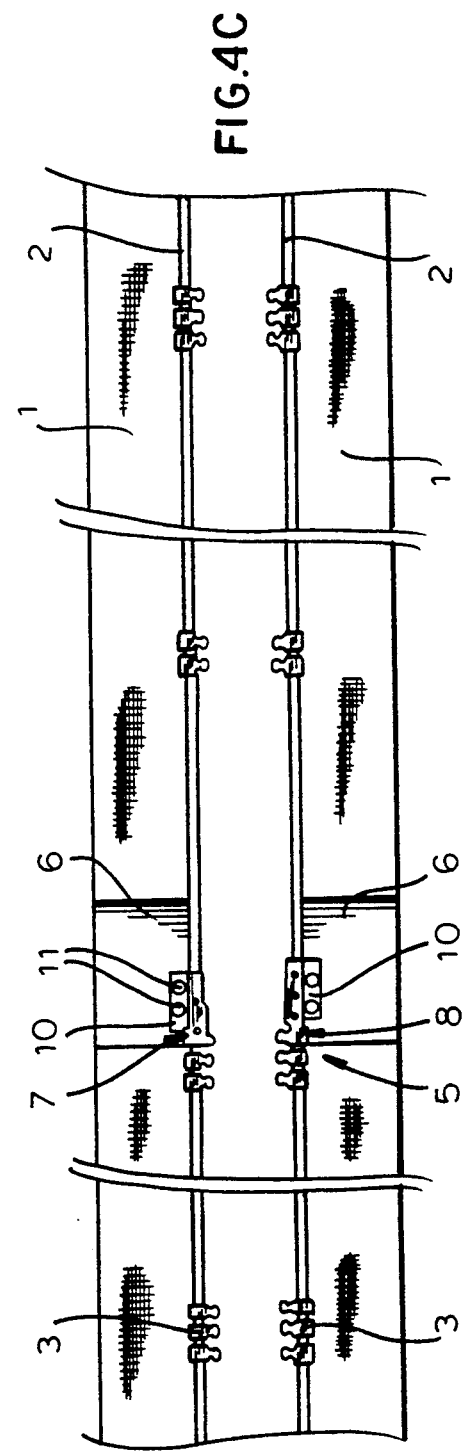

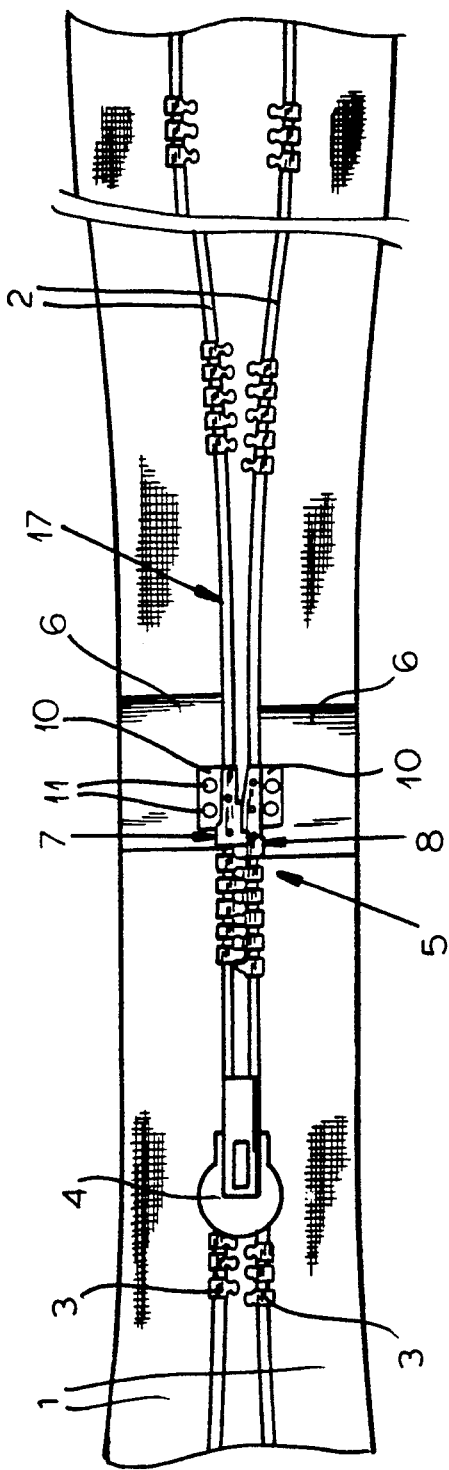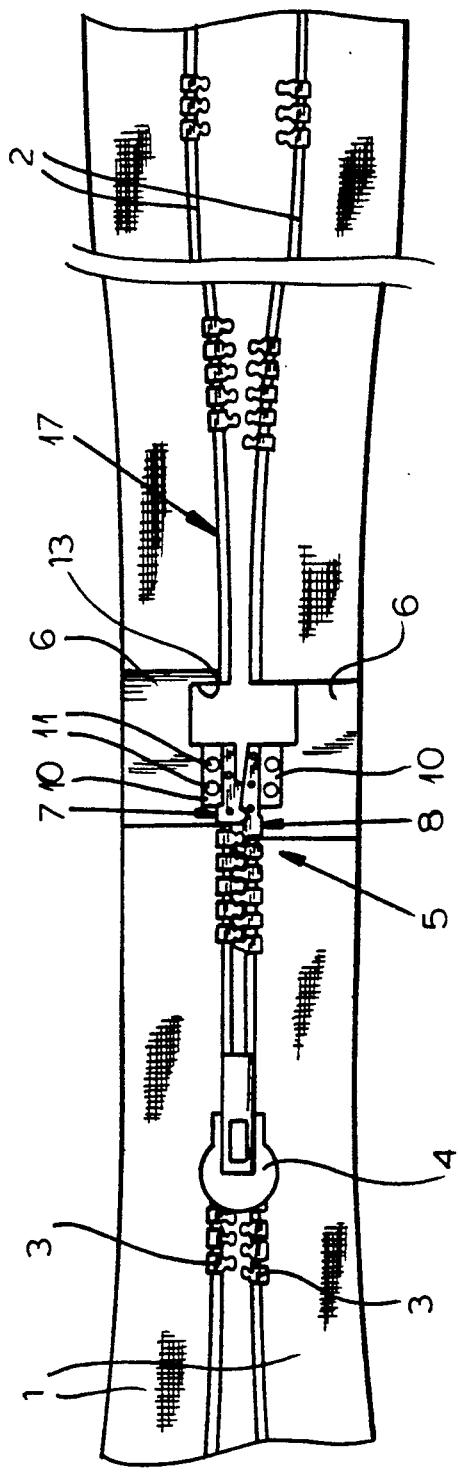

SLIDE FASTENER

FIELD OF THE INVENTION

The present invention relates to a slide fastener. More particularly this invention concerns a mass-produced separable slide fastener and a method of making same.

BACKGROUND OF THE INVENTION

A standard slide fastener has a pair of longitudinally extending and parallel textile tapes having thickened longitudinal edges that are transversely juxtaposed and that are provided with respective longitudinally extending rows of transversely projecting and interleavable coupling teeth. A slider having slots fittable over the edges can be moved along the edges over the teeth in one longitudinal direction for interleaving the teeth and coupling the tapes together transversely and in the opposite direction for disengaging the teeth from each other and decoupling the tapes from each other. The lower end of the fastener is provided with reinforcement tabs on which is mounted a separator comprised of a lug on each of the tape edges and a pocket or socket on the one tape so that the lugs can be united prior to closing the fastener with the slider.

Slide fasteners are invariably made in high-volume mass-production operations so that they can be produced at low unit costs. In the standard prior-art fastener the connection between the support tapes and the reinforcement tabs and between these tabs and the end lugs of the separator is typically a simple welded joint. Such a joint is often inadequately strong, so that it is at this location that the fastener will fail. The use of different incompatible resins is one of the reasons for such failure as, for instance, welding the reinforcement tabs to the textile tapes is problematic.

OBJECTS OF THE INVENTION

It is therefore an object of the present invention to provide an improved slide fastener.

Another object is the provision of such an improved slide fastener which overcomes the above-given disadvantages, that is which is substantially stronger than the prior-art devices.

A further object is to provide an improved method of making such a fastener.

SUMMARY OF THE INVENTION

A slide fastener according to the invention has a pair of longitudinally extending and parallel textile tapes having thickened longitudinal edges that are transversely juxtaposed and formed with throughgoing holes at transversely aligned locations and that are provided with respective longitudinally extending rows of transversely projecting and interleavable coupling teeth. A slider having slots fittable over the edges is displaceable along the edges over the teeth in one longitudinal direction for interleaving the teeth and coupling the tapes together transversely and in the opposite direction for disengaging the teeth from each other and decoupling the tapes from each other. Thickened synthetic-resin reinforcement tabs are integrally molded onto the tapes at the locations of the throughout holes and extend thereat transversely up to the edges. Synthetic-reins coupling lugs molded on the edges at the locations each have a pair of ribs flanking the respective tape at the respective holes and unitarily joined with each other through the tape at the holes. The lugs and their ribs are engageable through the respective slots of the slider.

Thus with this system the lugs are in effect formed with unitary pins of material that extend completely through the respective tapes at the respective reinforced regions to solidly and positively connect the lugs to the tapes. This is in sharp distinction to a molding of the lugs to the tapes with some modest penetration of the lugs into the weave or knit of the tapes. Even if the resin of the lugs is not of the type that can readily bond to the tapes, which in fact could be made of a natural fiber, the engagement through the holes will make a very solid connection.

According to another feature of this invention the reinforcement tabs are made of a low-melting-point glue layer aging and bonded to the respective tapes and a tear-resistant cover layer. The glue layer is made of polyurethane, copolyester, or copolyamide and has a melting point between 120° C. and 160° C. and the cover layer is made of polyamide or polyester and has a melting point between 210° C. and 260° C.

In accordance with further features of the invention the ribs have centering seats offset from the respective holes and from the respective edges. These seats can receive centering pins or lugs on the molds to ensure perfect positioning of all the molded parts.

The method according to this invention comprises the step of first burning the holes through the tapes and through the reinforcement tabs by means of ultrasound and thereafter molding the coupling lugs on the tapes over the holes.

BRIEF DESCRIPTION OF THE DRAWING

The above and other objects, features, and advantages will become more readily apparent from the following, reference being made to the accompanying drawing in which:

FIGS. 4A through 4G are top views illustrating successive steps of the method of this invention.

DESCRIPTION

Figure 1:
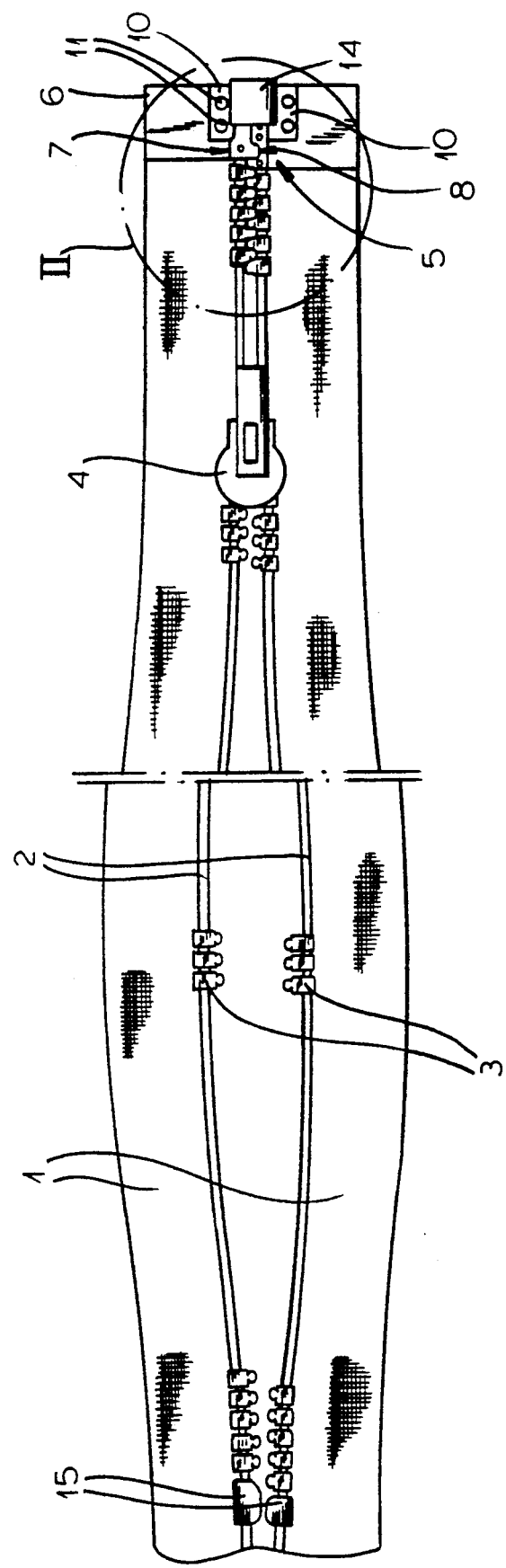
FIG. 1 is a top view of a slide fastener according to the invention.
Figure 2:
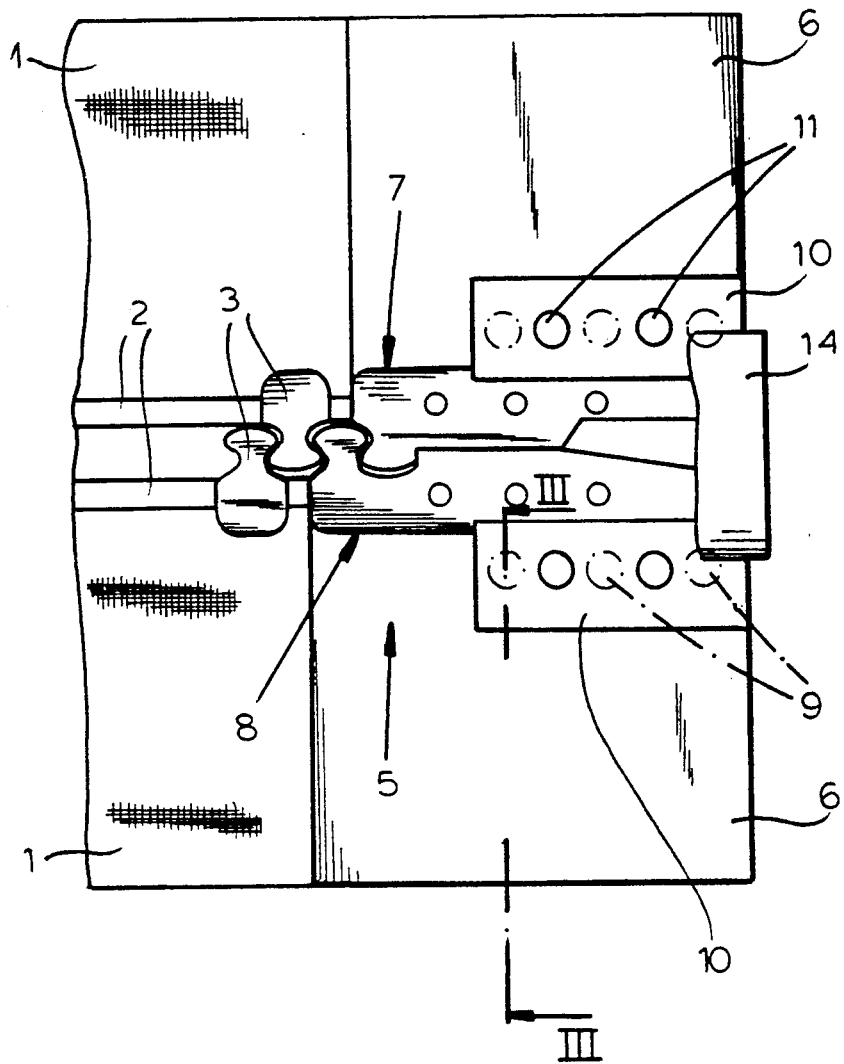
FIG. 2 is a large-scale view of the detail indicated generally at II in FIG. 1.
Figure 3:
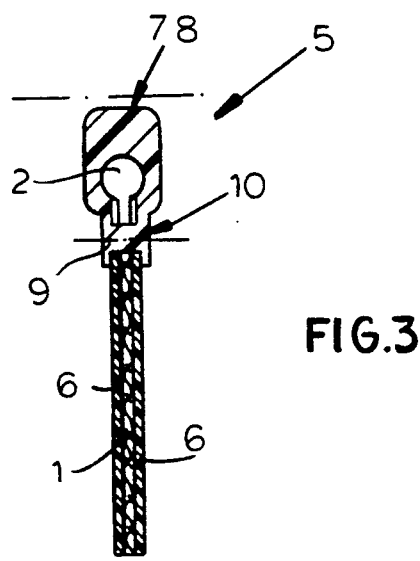
FIG. 3 is a section taken along line III—III of FIG. 1.

As seen in FIGS. 1 through 3 a slide fastener according to this invention has a pair of identical textile support tapes 1 formed with confronting thickened edge beads 2 onto which are molded coupling elements or teeth 3. A slider 4 can be displaced longitudinally along the teeth 3 on the edge beads 2 from right to left as seen in FIG. 1 to interdigitate the teeth 3 and close the fastener or oppositely to open it. At the so-called bottom end of the fastener is a separator 5 that is comprised of two bottom lugs 7 and 8 molded onto reinforced tabs 6 formed on the tapes 1. The lugs 7 and 8 are secured to the respective reinforce tabs 6 by integral molded pins 9 traversing the respective tapes 1 between centering ribs 10 that are separated by a gap receiving the respective reinforced tabs 6. These ribs 10 in turn are formed with outwardly open centering pockets 11 that cooperate with structure of the molds that form the separator 5. A lug-receiving pocket 14 of standard design is fixed to one of the end lugs 7 or 8.

The above-described slide fastener is made according to the steps shown sequentially in FIGS. 4A through 4G.

Figure 4A:
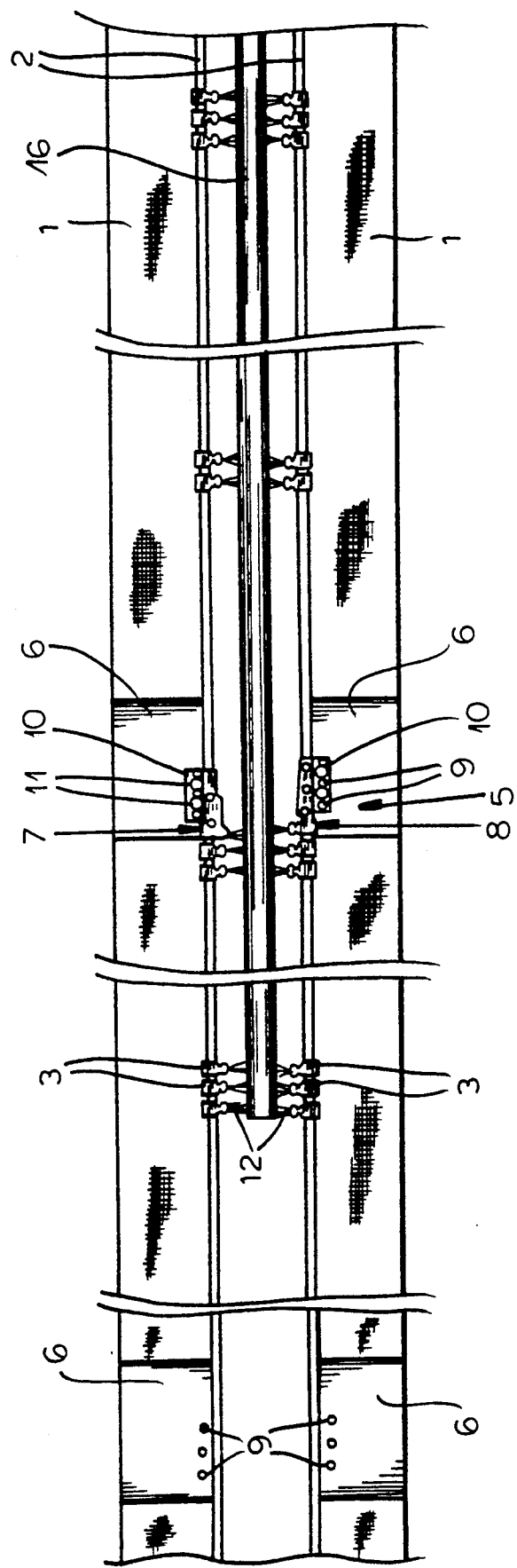

As seen in FIG. 4A to start with the reinforced tabs 6 are formed and secured in place by ultrasonic bore-welding so that they are solidly integrated with the tapes 1. Then the teeth 3 are molded on the tape edges 2 with these teeth 3 connected via flashing 12 to a core 16 and simultaneously or subsequently the bottom-end lugs 7 and 8 are molded in place, also connected via flashing 12 to the core 16, the centering holes 11 being formed during formation of the elements 7 and 8.

Then as shown in FIG. 4B the flashing and core 16 are stripped out and as shown in FIG. 4C the two tapes and their associated structure are offset longitudinally relative to each other by half the distance between adjacent teeth 3. This aligns the slide-fastener halves in the position they will assume in use for interleaving of the teeth 3.

FIG. 4D illustrates how the two halves are then interleaved and the slider 4 is mounted. To this end the teeth 3 stop somewhat below (to the right in the drawing) of the separator 5 to leave a gap 17 for mounting this slider 4.

The reinforced tabs 6 are then punched out at 13 as shown in FIG. 4E below the lugs 7 and 8, forming a pair of rectangular cutouts that confront each other and that define the ends of the succeeding fasteners being made on the tapes 1.

Figure 4F:
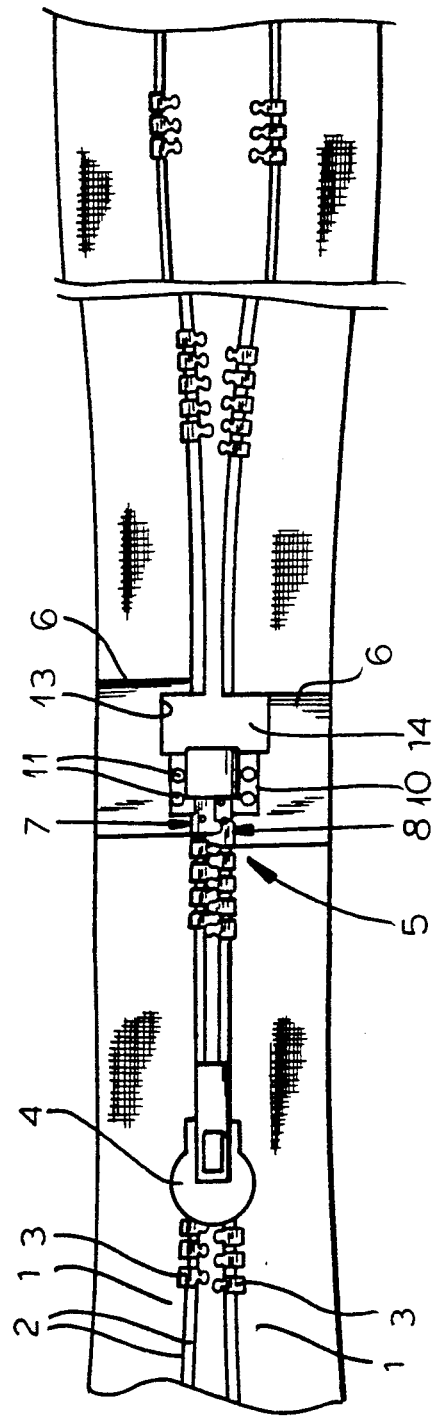

Then as shown in FIG. 4F the pocket 14 is mounted in place, being fixed to one of the elements 7 and 8 and the associated tab 6.

Figure 4G:
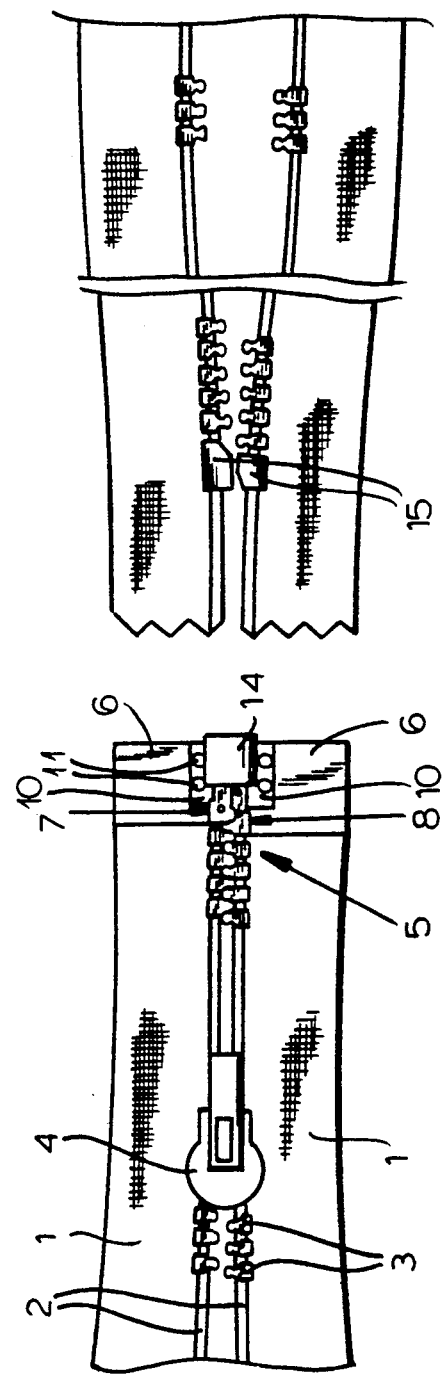

Finally as seen in FIG. 4G the tapes are cut across just below the separator 5 and top end stop members 15 are mounted at the upper ends of the following rows of teeth 3.

We claim:

1. A slide fastener comprising:
    a pair of longitudinally extending and parallel textile tapes having thickened longitudinal edges that are transversely juxtaposed, the tapes being formed offset from the edges with throughgoing holes at transversely aligned locations;
    respective longitudinally extending rows of transversely projecting and interleavable coupling teeth molded onto the edges;
    slider having slots fittable over the edges, the slider being displaceable along the edges over the teeth in one longitudinal direction for interleaving the teeth and coupling the tapes together transversely and in the opposite direction for disengaging the teeth from each other and decoupling the tapes from each other;
    respective thickened synthetic-resin reinforcement tabs integrally molded onto the tapes at the locations of the throughgoing holes and extending in the locations transversely to the respective edges; and
    respective synthetic-resin coupling lugs molded on the edges at the locations and each having a pair of ribs flanking the respective tabs at the respective holes and unitarily joined with each other through the tabs and through the tapes at the holes, the lugs and their ribs being engageable through the respective slots of the slider.

2. The slide fastener defined in claim 1 wherein the reinforcement tabs are made of a low-melting-point glue layer engaging and bonded to the respective tapes and a tear-resistant cover layer.

3. The slide fastener defined in claim 2 wherein the glue layer is made of polyurethane, copolyester, or copolyamide and has a melting point between 120° C. and 160° C. and the cover layer is made of polyamide or polyester and has a melting point between 210° C. and 260° C.

4. The slide fastener defined in claim 1 wherein the ribs have centering seats offset from the respective holes and from the respective edges.

* * * * *